(12) United States Patent
Oohashi

(10) Patent No.: US 8,434,708 B2
(45) Date of Patent: May 7, 2013

(54) COIL WINDING MACHINE FOR ROTOR

(75) Inventor: Yasushi Oohashi, Kariya (JP)

(73) Assignee: Denso Corporation, Kariya (JP)

( * ) Notice: Subject to any disclaimer, the term of this patent is extended or adjusted under 35 U.S.C. 154(b) by 259 days.

(21) Appl. No.: 12/917,824

(22) Filed: Nov. 2, 2010

(65) Prior Publication Data

US 2011/0101149 A1    May 5, 2011

(30) Foreign Application Priority Data

Nov. 5, 2009   (JP) ................................ 2009-254023

(51) Int. Cl.
*B21C 47/14*    (2006.01)
*H01F 41/06*    (2006.01)

(52) U.S. Cl.
USPC .................................... 242/439.1; 242/444.1

(58) Field of Classification Search ............... 242/433.2, 242/433.4, 439.1, 444.1
See application file for complete search history.

(56) References Cited

U.S. PATENT DOCUMENTS

| | | | | |
|---|---|---|---|---|
| 2,873,924 A | * | 2/1959 | Glazier et al. | 242/444 |
| 3,098,616 A | * | 7/1963 | Eminger | 242/433.3 |
| 4,826,092 A | * | 5/1989 | Tsugawa | 242/433.4 |
| 5,794,884 A | * | 8/1998 | Dolgas et al. | 242/433.3 |
| 2003/0047636 A1 | * | 3/2003 | Higashi et al. | 242/433.4 |
| 2008/0265083 A1 | | 10/2008 | Oohashi et al. | |

FOREIGN PATENT DOCUMENTS

| | | |
|---|---|---|
| JP | A-02-074141 | 3/1990 |
| JP | A-08-033291 | 2/1996 |
| JP | A-10-178767 | 6/1998 |
| JP | A-10-184505 | 7/1998 |
| JP | A-2000-014096 | 1/2000 |
| JP | A-2001-178108 | 6/2001 |
| JP | A-2004-274850 | 9/2004 |
| JP | A-2008-278587 | 11/2008 |

OTHER PUBLICATIONS

Aug. 9, 2011 Japanese Office Action issued in Japanese Patent Application No. 2009-254023 (with translation).

* cited by examiner

*Primary Examiner* — Emmanuel M Marcelo
(74) *Attorney, Agent, or Firm* — Oliff & Berridge, PLC

(57) ABSTRACT

A coil winding machine for winding a wire at a plurality of slots of a core of a coil rotor by feeding it out from a nozzle provided at a front end of a flyer, which coil winding machine is provided with a former, a fixed guide, and a movable guide for guiding the wire to the slots for winding and a clamper provided inside the fixed guide and clamping one shaft end of the rotor, the movable guide engaging with the other shaft end of the rotor and able to move in the axial direction of the core.

4 Claims, 4 Drawing Sheets

COIL WINDING MACHINE FOR ROTOR

TECHNICAL FIELD

The present invention relates to a coil winding machine for winding wire by a flyer at the core of a rotor of a rotating electrical machine, in particular a DC electric motor, induction motor, etc.

BACKGROUND ART

As a coil winding machine for winding a wire around the core of a rotor of a rotating electrical machine, a flyer type coil winding machine of a type provided with a flyer is known from, for example, Japanese Unexamined Patent Publication No. 2008-278587 etc. This flyer type coil winding machine makes a flyer rotate around a flyer rotation axis (Y-axis) perpendicular to a rotor axis (X-axis) while feeding out wire from a nozzle provided at the front end of the flyer (this type referred to as a nozzle rotation type). Further, it guides the wire by a guide part to a predetermined plurality of slots of the core of the rotor and winds it along paths including the slots. FIG. 1 shows an example of using a flyer type coil winding machine to wind a coil.

In such a flyer type coil winding machine, if winding a coil between slots of a core 23 facing each other across about 180 degrees, the shape of the coil at the coil end face bulged up in the axial direction like a mound and the desired shape could not be obtained. That is, the height dimension h became larger, the allowable height $h_0$ was exceeded, and the result became no good (see FIG. 1).

That is, if winding the wire separated into layers, the wire is superposed at the center part of the end face of the core 23, so the wire inevitably bulges up in a mound shape. When the coil is not wound at the predetermined position at each different layer, coil wound at the next layer is not wound at a stable position, so the allowable height $h_0$ ends up being exceeded in some cases. For this reason, the problem arose that it was not possible to satisfy the product specification size and the "occupancy rate" defined by the ratio of the area of the actually wound wire to the area which can be wound by the coil.

SUMMARY OF INVENTION

The present invention was made in consideration of the above problems and provides a coil winding machine winding a wire by a flyer around the core in the rotor of a rotating electrical machine, in particular a DC electric motor, induction motor, etc.

To solve the above problems, the aspect of the invention of claim 1 is a coil winding machine for winding a wire at a plurality of slots of a core of a coil rotor by feeding it out from a nozzle provided at a front end of a flyer, which coil winding machine is provided with a former, a fixed guide, and a movable guide for guiding the wire to the slots for winding and a clamper provided inside the fixed guide and clamping one shaft end of the rotor, the movable guide engaging with the other shaft end of the rotor and able to move in the axial direction of the core.

Due to this, it is possible to restrict the shape of the coil at the coil end face to the allowable height and possible to wind the coil at a stable position and raise the occupancy rate, so it is possible to reduce the product specification size and increase the product capability.

An aspect of the invention of claim 2 is comprised of the aspect of the invention of claim 1 characterized in that the wire is wound in slots facing each other across 180 degrees. Due to this, even if winding the coil between slots of the core facing each other across 180 degrees or so, the shape of the coil at the coil end face will no longer bulge upward in the axial direction like a mound and the desired shape can be obtained.

An aspect of the invention of claim 3 is comprised of the aspect of the invention of claim 1 characterized in that the movable guide has a frustoconical shape comprised of a flat center part and a taper part. Due to this, it is possible to wind the wire to first gather at the center part of the core end face and, at the next layer of winding and on, wind the wire 1 to gather at the outer periphery of the core 23 end face. That is, it is possible to suppress variation in the coil height and coil position at the different layers.

An aspect of the invention of claim 4 comprises the aspect of the invention of claim 1 wherein when winding the wire in multiple layers in the slots, the distance between the movable guide and the end face of the core at the other shaft end side is set so that at the initial layer of winding, the wire gathers at the center part of the core end face and at the next and later layers of winding, the wire gathers at the outer periphery of the core end face. Due to this, the shape of the coil at the coil end face will no longer bulge upward in the axial direction like a mound and the desired shape can be obtained. It is possible to suppress variation in the coil height and coil position at the different layers and change the movable guide to a suitable position for each layer.

DESCRIPTION OF EMBODIMENTS

Figure 1:
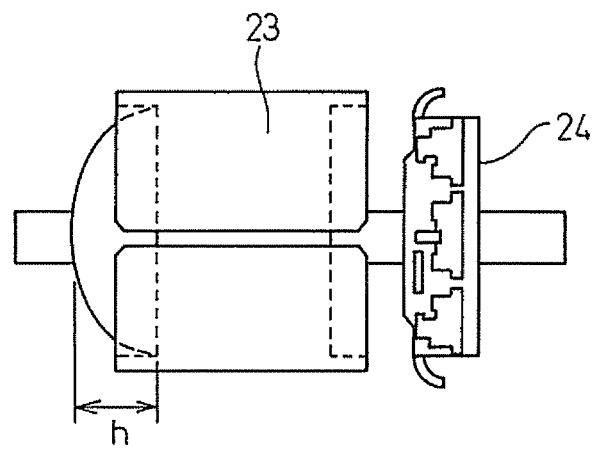
FIG. 1 is an example of using a flyer type coil winding machine to wind a coil.

Below, referring to the drawings, an embodiment of the present invention will be explained. In the embodiments, parts of the same configuration are assigned the same reference notations and explanations omitted.

Figure 2:
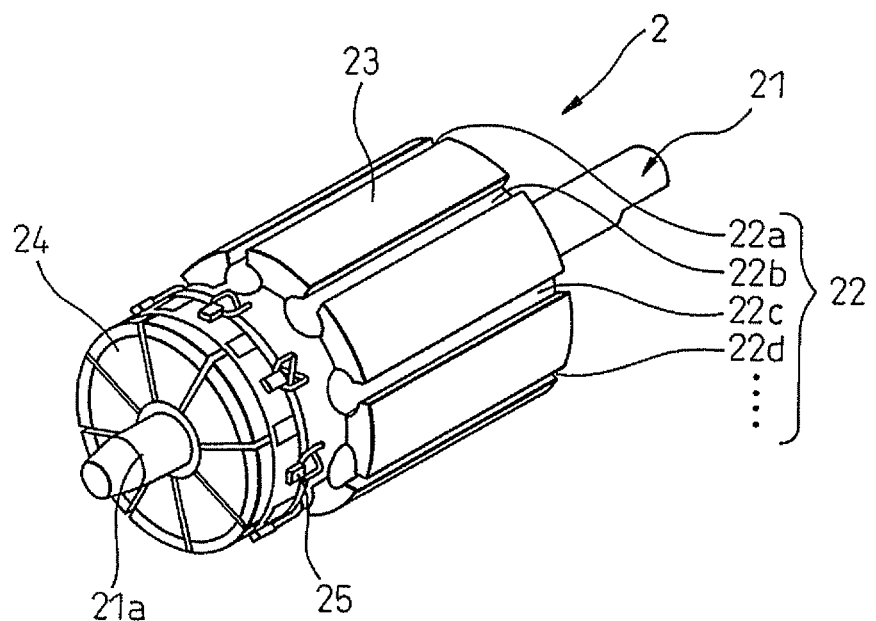
FIG. 2 is a perspective view of a rotor using the coil in an embodiment of the present invention.

FIG. 2 is a perspective view of a rotor 2 using the coil 1 in an embodiment of the present invention. In the embodiment of the present invention, the case of a rotor 2 of a four-phase DC electric motor for which a coil 1 is wound at slots 22 of a core 23 facing each other across about 180 degrees (among the eight slots 22a, . . . , 22h, for example, 22a, 22e, etc.) will be explained, but the invention is not limited to this. The invention is not limited to the rotor of a four-phase DC electric motor. Any number of phases is possible. The number of slots is also not limited to eight slots. There may also be 10 slots or any other number of slots (the number of winding slots differs depending on the product). The winding slots are slots facing each other across 180 degrees, but the invention is not limited to this. All winding methods are included in the present invention. Furthermore, the present invention can also be applied to an induction motor or other rotary machine.

Before explaining a coil winding machine, the workpiece, that is, a rotor 2, will be explained. FIG. 2 shows a product using the coil winding machine of an embodiment of the present invention, that is, a rotor 2. This rotor 2 is provided with shafts 21, 21*a*, a substantially cylindrical core 23 formed with eight slots 22 (22*a*, . . . , 22*h*) in the axial direction, and a substantially cylindrical commutator 24 having a diameter smaller than the core 23 on the shaft 21. The commutator 24 is provided with the same number of coil hooks 25 as the slots 22. The coil hooks 25 have the wire 1 wound around them. FIG. 2 does not show the wire wound between the slots 22, but in the rotor 2 in the present embodiment, as one example, as shown by the slots 22*a* and 22*e* or slots 22*b* and 22*f* of the figure, a pair of slots 22 facing each other across 180 degrees are used as the slots for the coil.

Figure 3A:
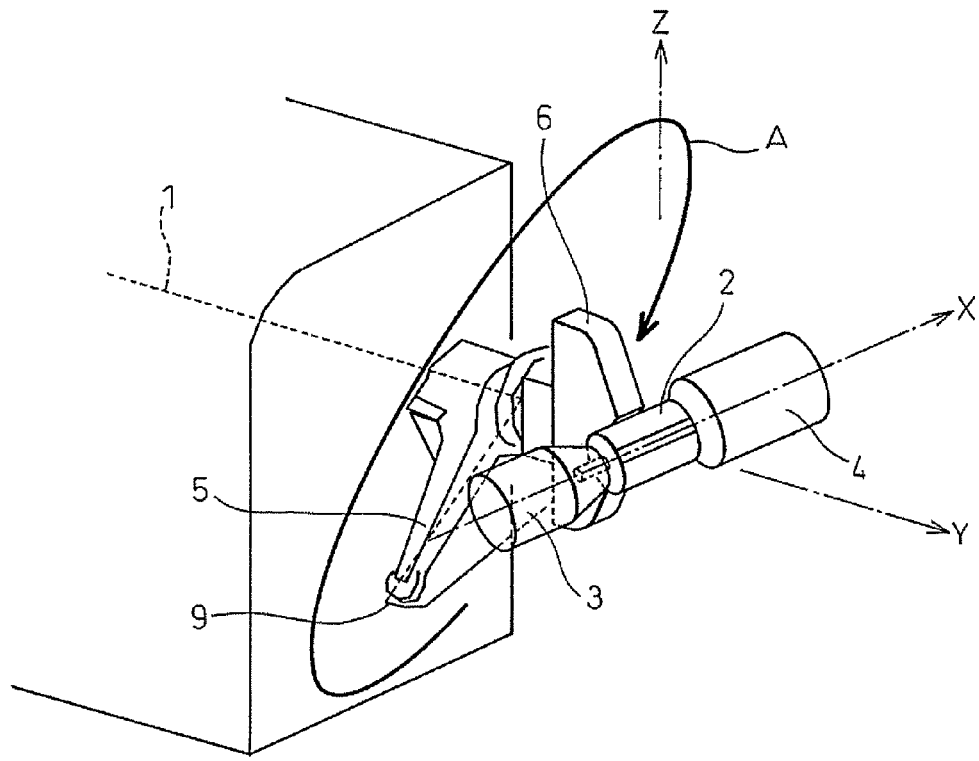
FIG. 3A is a perspective schematic view schematically showing the relationship between the flyer rotational axis and the rotor in an embodiment of the present invention.
Figure 3B:
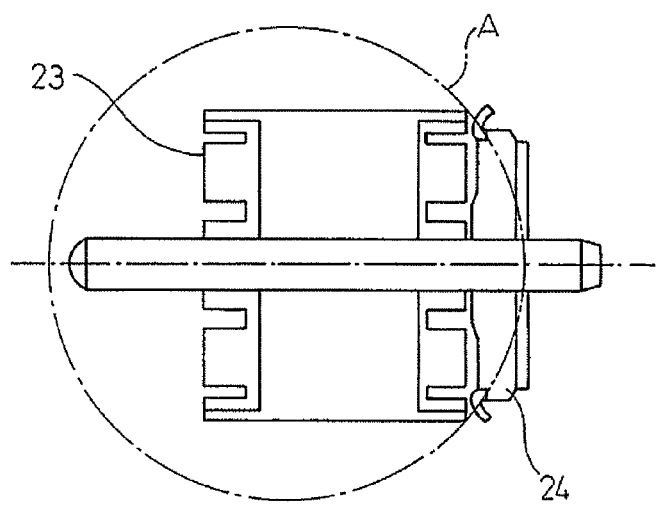
FIG. 3B is a schematic view showing a winding rotation path of a flyer.
Figure 4A:
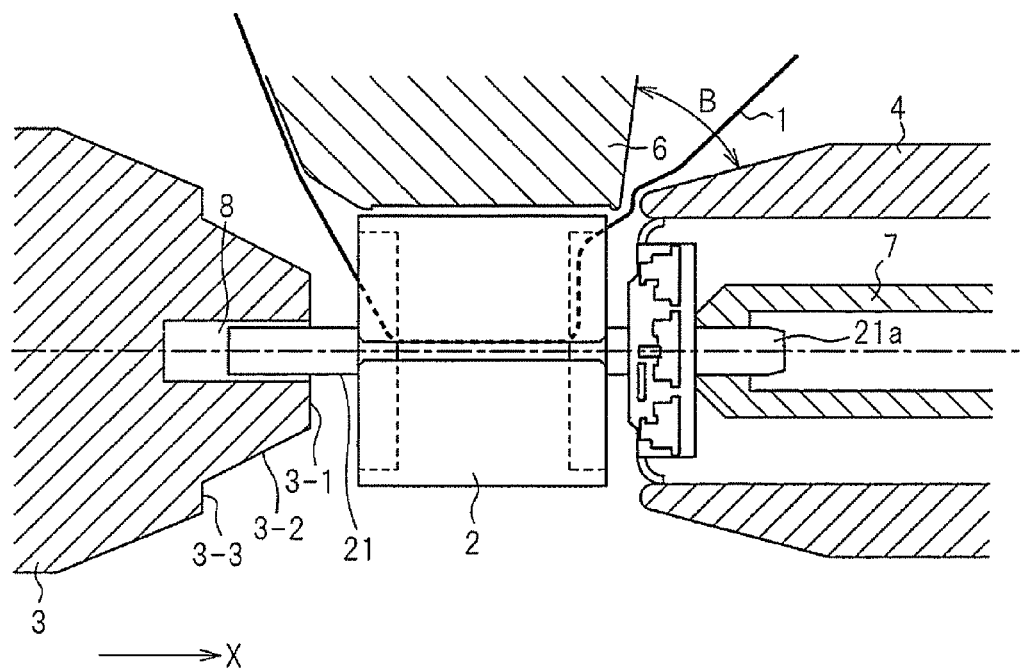
FIG. 4A is a cross-sectional view showing main parts of an embodiment of the present invention.
Figure 4B:
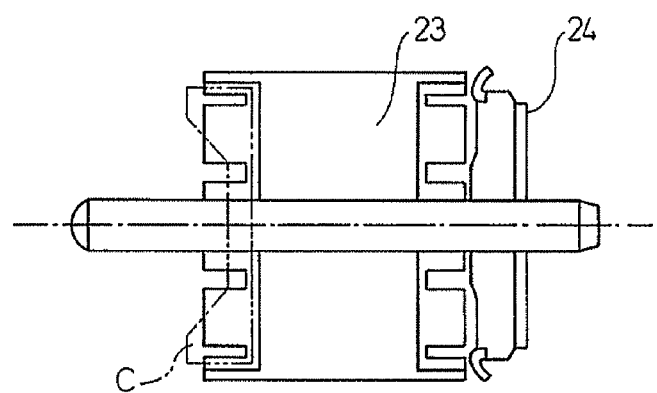
FIG. 4B is a view showing a carriable range C defined by the movable guide.
Figure 5:
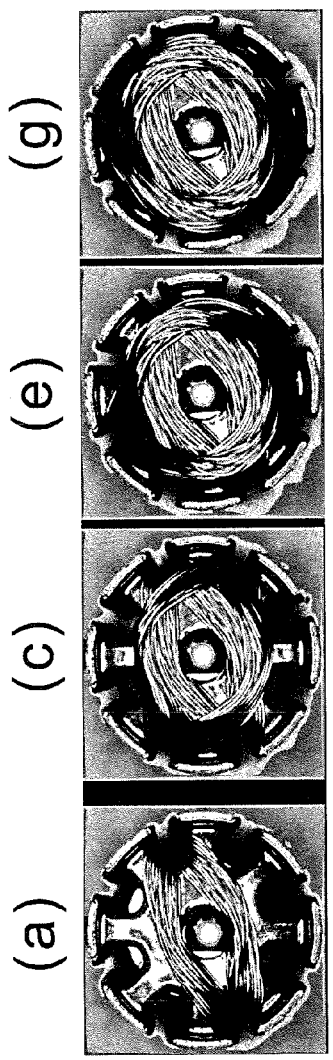
FIG. 5 is a schematic view explaining the operation of an embodiment of the present invention. (a) and (b) are explanatory views of the state of a first winding layer, (c) and (d) second winding layer, (e) and (f) third winding layer, and (g) and (h) fourth winding layer.
Figure 5:
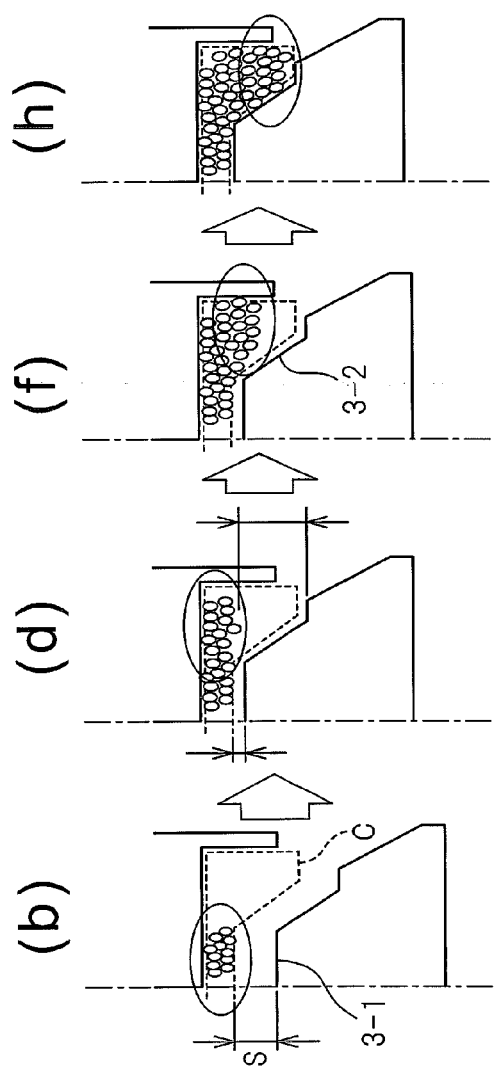

FIG. 3A is perspective schematic view schematically showing the relationship between the flyer rotational axis and rotor in an embodiment of the present invention. FIG. 3B is a schematic view showing a winding rotation path A of a flyer. FIG. 4A is a cross-sectional view showing main parts of an embodiment of the present invention. FIG. 4B is a view showing a carriable range C defined by the movable guide. FIG. 5 is a schematic view for explaining an operation of an embodiment of the present invention. (a) and (b) are explanatory views of a first winding layer, (c) and (d) second winding layer, (e) and (f) third winding layer, and (g) and (h) fourth winding layer.

Referring to FIG. 3A to FIG. 5, a coiling apparatus of the present embodiment will be explained.

In FIG. 3A, only one flyer 5 is shown, but there is a similar separate flyer 5' symmetric in the X-Z plane in the arrow side of the Y-axis. However, the flyer 5 and flyer 5' rotate with rotational phases offset by 180 degrees. Since they rotate offset in phases by 180 degrees, the two do not interfere. Further, the other flyer 5' is exactly the same in configuration except for being offset in phase by 180 degrees, so only the flyer 5 will be explained in the following description.

The flyer 5 (5') of the coil winding machine rotates about a common flyer rotational axis Y perpendicular to the rotational axis X of the rotor 2. As a result, the front end of the flyer 5 (5') orbits a circular path in the plane perpendicularly intersecting the flyer rotational axis Y. FIG. 3B shows the rotational path A seen from the Y-axis (circular path of front end of flyer). In this case, the center of the core 23 is eccentric from the Y-axis, but the invention is not limited to this.

Due to the orbiting motion of the front end of this flyer 5, the wire 1 is pulled out from the nozzle 9 of the front end. The pulled out wire 1 is guided by the former 6 to the pair of slots 22*a* and 22*e* (separated by 180 degrees) of the coil. The former 6 is formed as a block shaped member having slanted surfaces so as to guide the wire 1 to predetermined slots 22 and is arranged at the inside of the circular path A of the front end of the flyer 5. The former 6 is designed to be able to advance and retract in a direction parallel to the flyer rotational axis Y in accordance with the outside diameter of the rotor 2.

The clamper 7 clamps the shaft end 21*a* of the rotor 2 *a* the commutator side so as to fasten the rotor 2 to the coil winding machine. Furthermore, the clamper 7 can turn the clamped shaft 21 by exactly a predetermined angle (as one example, 45 degrees) so as to position the slots 22 to be coiled at the coil positions. For this reason, the clamper 7 is provided with a drive portion for advancing, retracting, turning, and clamping the clamped shaft 21*a* of the rotor 2. At the outer periphery of the clamper 7, a fixed guide 4 is provided. This is formed so as to cover the commutator 24. The fixed guide 4 is provided so as to cover the commutator so as to prevent the wire 1 being wound from contacting the commutator and being damaged. Furthermore, the fixed guide 4 guides the wire 1 at its outer circumference. The outer contour of the fixed guide 4 is made a tapered cylindrical shape so that the wire 1 does not catch on it at the time of winding.

The shaft end 21 of the rotor 2 at the opposite side from the commutator slides engaging with a sliding hole 8 of the movable guide 3. The movable guide 3 moves with respect to the rotor 2 in the X-axial direction (axial direction) and stops and is positioned at a suitable position. The state of positioning will be explained later by FIG. 5. By movement of the movable guide 3, as shown FIG. 4B, the coil 1 can be wound on the rotor 2 limited to the carriable range C defined by the movable guide.

Regarding the shape of the movable guide 3, the carriable range C is reduced in allowable height from the outer periphery toward the center, so the shape of the movable guide is made a shape matching with this carriable range C. That is, as shown in FIG. 4A, the center part 3-1 of the front end is a flat surface. The part from the center part to the outer periphery is slanted to form a taper part 3-2. The result is a frustoconical shape. A step difference 3-3 is provided in the middle.

Next, the operation of the present embodiment will be explained, referring to FIG. 3A to FIG. 5, by the example of formation of eight slots 22 (22*a*, . . . , 22*h*).

Due to turning of the front end of the flyer 5, the wire 1 is pulled out from the front end. The pulled out wire 1 is guided by the Z-axial direction slanted surface of the former 6 and the fixed guide 4 to the pair of slots 22*a* and 22*e* for coiling (separated by 180 degrees). Along with rotation of the flyer 5, the incident angle changes. As seen in FIG. 4A, the incident angle of the wire fluctuates within the angle B. The former 6 guides the wire so as to enter the predetermined winding slots 22 of the rotor 2 and so as not to enter the other slots or ride up on the outer periphery of the product. Further, it has the function of preventing the wire from striking and being damaged by the edges of the winding slots 22 of the rotor 2. For this reason, the shapes of the fixed guide 4 and former 6 differ depending on the product shape and winding ability.

As seen in FIG. 5, the procedure from winding of the first layer to winding of the fourth layer will be explained.

(1) A workpiece, that is, a rotor 2, is set at the coil winding machine.

(2) The flyer 5 (nozzle type) is made to rotate to wind the first layer of wire 1 (as one example copper wire) at the slots 22*a* and 22*e*. During winding, the core 23 of the rotor 2 does not rotate.

(3) After the first layer finishes being wound, that is, after the flyer is stopped, the core 23 is turned 45° and the movable guide 3 is advanced.

(4) The flyer 5 is again made to rotate to wind the second layer of wire 1 at the slots 22*b* and 22*f*.

(5) After the second layer finishes being wound (after the flyer is stopped), the core 23 is turned 45° and the movable guide 3 is advanced.

(6) The flyer 5 is again made to rotate to wind the third layer of wire 1 at the slots 22*c* and 22*g*.

(7) After the third layer finishes being wound (after the flyer is stopped), the core 23 is turned 45° and the movable guide 3 is advanced.

(8) The flyer 5 is again made to rotate to wind the fourth layer of wire 1 at the slots 22*d* and 22*h*.

(9) Finally, the winding operation is ended, then the movable guide 3 is retracted and the workpiece is taken out.

For the method of changing the position of the movable guide, as one example, the position of the movable guide is changed as follows for each layer.

At the first winding layer, the center part 3-1 of the front end of the movable guide 3 is positioned near the center of the end face of the core 23 so that the second winding layer and on of the coil do not overlap it. To prevent from the coil from greatly sticking out in the height direction (to keep it at least within an allowable height), it is arranged at a position with a relatively large space "s" (see FIG. 5B).

At the second and third winding layers, the movable guide 3 is arranged at a position advanced by exactly 0.5 mm from the position at the time of the first winding layer. In the same way as the first winding layer, the center part 3-1 of the front end of the movable guide 3 is used to keep the third winding layer and on of the coil from overlapping. At the third winding layer, the wire is guided by the taper part 3-2 of the outer periphery of the movable guide so that the coil does not stick out near the outer periphery of the end face of the core 23.

At the fourth winding layer, the movable guide 3 is made to advance by exactly 0.5 mm from the position at the time of the second and third winding layers and arranged at a position near the carriable range C so that the coil does not exceed the carriable range C due to the center part 3-1 of the movable guide 3 and taper part 3-2 of the outer periphery of the movable guide.

Here, the "position advanced by 0.5 mm" of the second and third winding layers is not limited to 0.5 mm and may be changed according to the product dimensions or the wire diameter. The movable guide is made to move to a suitable position in accordance with the limit value of the coil in the height direction.

That is, the thinking in moving the movable guide 3 at the different layers is as follows:

At the first layer of the coil, the coil is made to gather as much as possible at the center of the end face of the core 23. For this reason, the movable guide 3 is positioned at a location increasing the relative space between the center part 3-1 of the movable guide and the end face of the core 23 so that the wire 1 will be wound gathered at the center. Even at the center of the end face of the core 23, the height of the coil of the product is restricted, so the wire has to be guided so as not to exceed the limit value.

At the second and third winding layers, the movable guide 3 is made to move to match with the limit value of the coil in the height direction. At the fourth layer, the movable guide 3 is positioned at a position where it can perform the function as a guide in the state not reaching a pressing state.

In the above explanation, in the rotor 2 of the present embodiment, a pair of slots 22 facing each other across 180 degrees such as the slots 22a and 22e or the slots 22b and 22d of FIG. 2 was used to form the coil, but, as shown in Japanese Unexamined Patent Publication No. 2008-278587, even when three teeth (rotor teeth) are wound or when a single tooth is wound, the present invention can of course be applied. The movable guide can use the coil 1 as a guide and restrict the coil to within the allowable height with respect to the end face of the core 23. The winding slots are slots facing each other across 180 degrees in the winding, but all winding methods are included in the present invention. Furthermore, the present invention can also be applied to induction motors and other rotary machines.

While the invention has been described by reference to specific embodiments chosen for purposes of illustration, it should be apparent that numerous modifications could be made thereto by those skilled in the art without departing from the basic concept and scope of the invention.

The invention claimed is:

1. A coil winding machine for winding a wire at a plurality of slots of a core of a coil rotor by feeding it out from a nozzle provided at a front end of a flyer,
   which coil winding machine is provided with
   a former, a fixed guide, and a movable guide for guiding said wire to said slots for winding and
   a clamper provided inside said fixed guide and clamping one shaft end of said rotor,
   said movable guide engaging with the other shaft end of said rotor and able to move in the axial direction of said core,
   wherein said movable guide has a frustoconical shape comprised of a flat center part and a taper part.

2. A coil winding machine as set forth in claim 1, wherein said wire is wound in slots facing each other across 180 degrees.

3. A coil winding machine as set forth in claim 2, wherein when winding said wire in multiple layers in said slots, the distance between said movable guide and an end face of said core at the other shaft end side is set so that at the initial layer of winding, said wire gathers at a center part of said core end face and at the next and later layers of winding, said wire gathers at an outer periphery of said core end face.

4. A coil winding machine as set forth in claim 1, wherein when winding said wire in multiple layers in said slots, the distance between said movable guide and an end face of said core at the other shaft end side is set so that at the initial layer of winding, said wire gathers at a center part of said core end face and at the next and later layers of winding, said wire gathers at an outer periphery of said core end face.

* * * * *